(12) United States Patent
Tanaka

(10) Patent No.: US 8,070,907 B2
(45) Date of Patent: Dec. 6, 2011

(54) JOINTING METHOD FOR OBTAINING A JOINT STRUCTURE FORMED OF A PLURALITY OF PARTS

(75) Inventor: Hironori Tanaka, Atsugi (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 1101 days.

(21) Appl. No.: 11/500,109

(22) Filed: Aug. 7, 2006

(65) Prior Publication Data

US 2006/0266471 A1 Nov. 30, 2006

Related U.S. Application Data

(62) Division of application No. 10/701,962, filed on Nov. 5, 2003, now abandoned.

(30) Foreign Application Priority Data

Nov. 7, 2002 (JP) ................................. 2002-324051

(51) Int. Cl.
*B29C 65/16* (2006.01)
(52) U.S. Cl. ............... 156/272.8; 156/273.3; 156/273.7; 156/275.1; 156/275.3; 156/275.5; 156/275.7; 360/244.2; 360/244.7; 360/244.8; 360/244.9
(58) Field of Classification Search ............... 156/272.8, 156/272.2, 273.3, 273.5, 273.7, 275.1, 275.3, 156/275.5, 275.7; 360/244.2, 244.7, 244.8, 360/244.9
See application file for complete search history.

(56) References Cited

U.S. PATENT DOCUMENTS

| | | | | |
|---|---|---|---|---|
| 5,866,870 A | * | 2/1999 | Walduck | 219/121.45 |
| 5,875,071 A | | 2/1999 | Erpelding et al. | |
| 5,877,919 A | * | 3/1999 | Foisy et al. | 360/244.6 |
| 6,179,679 B1 | * | 1/2001 | von Gutfeld et al. | 445/25 |
| 6,676,778 B1 | * | 1/2004 | Tuchiya et al. | 156/64 |
| 6,778,362 B1 | * | 8/2004 | Davis et al. | 360/244.8 |
| 2001/0008475 A1 | * | 7/2001 | Takagi et al. | 360/244.8 |

FOREIGN PATENT DOCUMENTS

| | | |
|---|---|---|
| CN | 1276602 A | 12/2000 |
| CN | 1345033 A | 4/2002 |
| JP | 5-245670 A | 9/1993 |
| JP | 05-290490 A | 11/1993 |
| JP | 10-003634 A | 1/1998 |
| JP | 2001-155458 A | 6/2001 |
| JP | 2002-237018 A | 8/2002 |
| WO | WO 2004/050738 | 6/2004 |

* cited by examiner

*Primary Examiner* — Christopher Schatz
(74) *Attorney, Agent, or Firm* — Holtz, Holtz, Goodman & Chick, PC

(57) ABSTRACT

A jointing apparatus includes a first laser head which emits a laser beam for adhesive heating and a second laser head which emits a laser beam for welding. In jointing components of a work with a thermosetting adhesive agent, the defocused laser beam is applied to an adhered part for a short time. Thereupon, the adhesive agent is primarily cured so that the components are tacked together. In spot-welding the components, the laser beam for welding that is converged by the second laser head is applied to a spot-welded joint.

2 Claims, 5 Drawing Sheets

JOINTING METHOD FOR OBTAINING A JOINT STRUCTURE FORMED OF A PLURALITY OF PARTS

CROSS-REFERENCE TO RELATED APPLICATIONS

The present application is a Divisional Application of U.S. patent application Ser. No. 10/701,962, filed Nov. 5, 2003 now abandoned which is based upon and claims the benefit of priority from the prior Japanese Patent Application No. 2002-324051, filed Nov. 7, 2002, the entire contents of which are incorporated herein by reference.

BACKGROUND OF THE INVENTION

1. Field of the Invention

The present invention relates to a component jointing apparatus used to joint components together and a joint structure formed of a plurality of components.

2. Description of the Related Art

A hard disc drive (HDD) that is used to record in or read data from a rotating disc has a disc drive suspension that is attached to the distal end portion of an actuator arm. A head portion that includes a slider is mounted on the distal end portion of the suspension. When the disc rotates, the slider slightly lifts above the disc surface, whereupon an air bearing is formed between the disc and the slider.

The disc drive suspension comprises a load beam, a baseplate provided on the basal part of the load beam, a flexure fixedly lapped on the load beam, etc. The slider is attached to the distal end of the flexure. Further, a hinge member is located between the load beam and the baseplate.

As is described in Jpn. Pat. Appln. KOKAI Publication No. 2001-155458, for example, the disc drive suspension is formed by jointing together a plurality of platelike components, such as the load beam, baseplate, flexure, etc. These components are fixed to one another by spot welding or the like.

Improvement of the response (seek time) of the disc drive requires a disc drive suspension having high stiffness and high natural frequency. With the spread of portable computers, the shock resistance of the disc drive has become an important factor.

In order to enhance the shock resistance of the disc drive suspension or increase the natural frequency, it is effective to reduce the weight of the suspension without lowering its stiffness. To attain this, the components (load beam, baseplate, hinge member, etc.) that constitute the suspension should be formed of materials that suit their respective functions.

In some cases, therefore, the components are expected to be formed of any other materials than metal, cladding materials, or unweldable materials. In general, components of a disc drive suspension are jointed together by laser welding. Depending on the materials of the components, however, laser welding cannot be applied to the jointing.

A proposal has been made to joint the components with an adhesive agent instead of welding them. For example, the components may be jointed with an ultraviolet-curing adhesive agent or thermosetting adhesive agent.

In order to cure the ultraviolet-curing adhesive agent, however, the components should be partially formed having holes through which light passes. Inevitably, therefore, the shape of the components is complicated, and their stiffness is lowered.

If the thermosetting adhesive agent is used, the components should be positioned with respect to one another by means of a jig after the adhesive agent is supplied to those regions of the components to be jointed. Further, the components should be heated in a heating oven for a long time. Since the next process cannot be started while this heating process is being carried out, the operating efficiency is not high enough.

Conventionally, an apparatus for welding and an apparatus for setting the adhesive agent are provided separately. Thus, separate apparatuses must be used to carry out a welding process and a bonding process for a work that has a bonded part to be bonded with the adhesive agent and spot-welded joints in a mixed fashion. In consequence, the processes are complicated and time-consuming.

BRIEF SUMMARY OF THE INVENTION

Accordingly, the object of the present invention is to provide a jointing apparatus, capable of alternatively carrying out jointing with an adhesive agent and jointing by welding, and a joint structure formed of a plurality of components.

A component jointing apparatus according to present invention comprises a positioning jig which holds a plurality of components in layers in a predetermined position and a laser irradiator which applies a laser beam to an adhered part or spot-welded joint of each component. The laser irradiator is provided with beam control means. The beam control means defocuses and applies the laser beam to the adhered part to heat a thermosetting adhesive agent supplied to the adhered part when the components are fixed to one another with the thermosetting adhesive agent, and converges the laser beam within a range narrower than the range for the adhered part and applies the laser beam to the spot-welded joint when the components are spot-welded to one another with the laser beam.

According to this configuration, jointing with the thermosetting adhesive agent and jointing by the spot welding can be properly used according to various works to be jointed. Further, the apparatus can be used to joint the components of a work that has the adhered part and the spot-welded joint in a mixed fashion as well as to joint the components of a work that has the adhered part only or the spot-welded joint only.

"Defocusing" used herein is a concept that implies shifting the focus of the laser beam in the direction of the optical axis with respect to a heated surface of the work and/or using the laser beam for scanning in a range of a certain extent without fixing the focus to one spot.

The beam control means of the laser irradiator includes a first laser head which defocuses and applies the laser beam to the adhered part and a second laser head which converges and applies the laser beam to the spot-welded joint, for example. With use of the first laser head that emits a laser beam for adhesive heating and the second laser head that emits a laser beam for welding, according to this configuration, jointing with the thermosetting adhesive agent and jointing by the laser spot welding can be selected according to the work.

Alternatively, the beam control means of the laser irradiator includes a focal position adjusting mechanism which defocuses the laser beam when the laser beam is applied to the adhered part and converges the laser beam on the spot-welded joint when the laser beam is applied to the spot-welded joint, for example. According to this configuration, jointing with the thermosetting adhesive agent and jointing by the spot welding can be properly used by means of one laser head.

A joint structure according to the invention components a plurality of components including a platelike component. The platelike component and any other component than the platelike component are fixed to each other with a thermosetting adhesive agent. Alternatively, a joint structure according to the invention comprises an adhered part at which a platelike component and any other component than the platelike component are fixed to each other with a thermosetting adhesive agent, and a spot-welded joint at which the platelike component and the other component than the platelike component are fixed to each other by laser spot welding. According to these joint structures, those components which cannot be welded with ease are jointed together with the adhesive agent, so that the degree of freedom of material selection for the components that constitute the joint structures. Thus, the joint structures may be formed of lightweight, high-stiffness materials.

An example of the component may be a load beam, baseplate, hinge member, or flexure which constitutes a disc drive suspension. According to this configuration, those components which cannot be welded with ease can be jointed together in the disc drive suspension that requires light weight and high natural frequency. Thus, the performance of a disc drive can be improved by the use of materials that suit the components of the suspension.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A jointing apparatus 10 according to a first embodiment of the present invention and a disc drive suspension 50A, as an example of a joint structure (work W), will now be described with reference to FIGS. 1 to 5.

Figure 1:
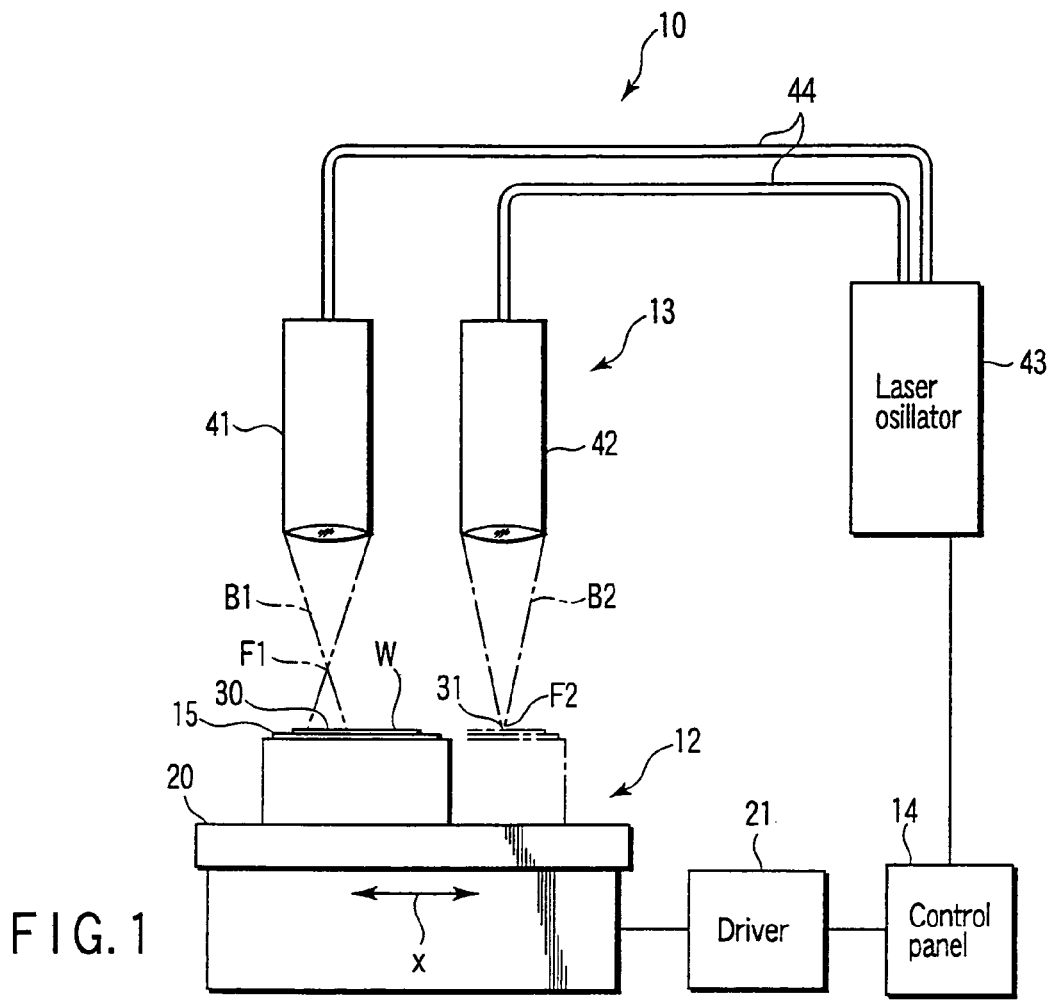
FIG. 1 is a side view showing a jointing apparatus according to a first embodiment of the invention.

The jointing apparatus 10 shown in FIG. 1 is used in a step of jointing components of the work W or the joint structure that is formed of a plurality of components by adhesive bonding or welding. The jointing apparatus 10 comprises a work holding mechanism 12 that holds the work W in a predetermined position, laser irradiator 13, controller 14, etc. The work holding mechanism 12 is provided with a positioning jig 15.

The work holding mechanism 12 comprises a moving table 20, which is movable within a horizontal plane in the directions of X- and Y-axes, a driver 21 that moves the moving table 20 in the directions of the X- and Y-axes, etc. The direction of an example of the X-axis is indicated by arrow X in FIG. 1, and the Y-axis extends at right angles to the X-axis.

Figure 2:
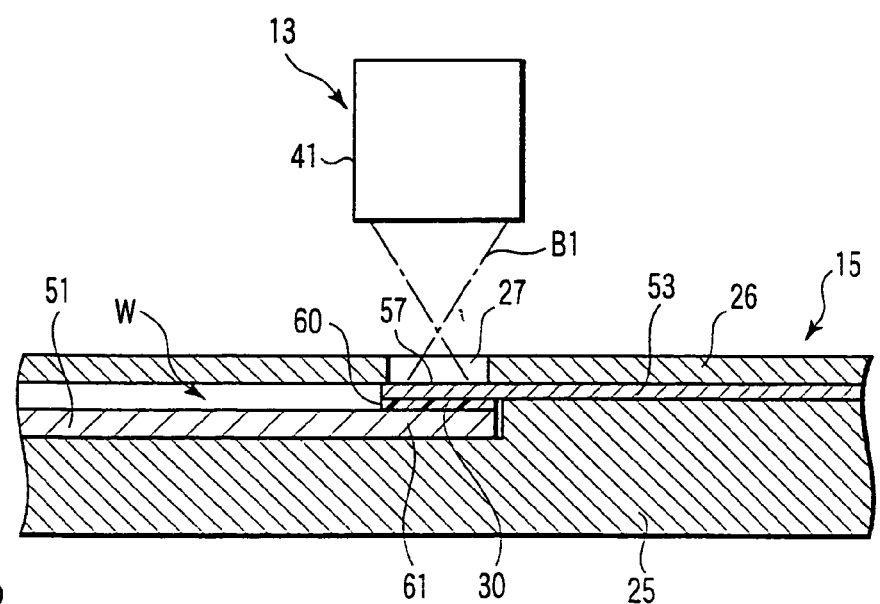
FIG. 2 is a sectional view showing a positioning jig for the jointing apparatus shown in FIG. 1.

As shown in FIG. 2, the positioning jig 15 has a lower die 25 that positions the work W and a presser plate 26. A through hole 27 is formed in the plate 26. The hole 27 is situated corresponding to an adhered part 30 or each spot-welded joint 31 of the work W.

The laser irradiator 13 comprises a first laser head 41, second laser head 42, laser oscillator 43, optical guide member 44 such as an optical fiber, etc. The guide member 44 guides laser beams delivered from the laser oscillator 43 to the laser heads 41 and 42. A YAG laser oscillator capable of 50-W pulse oscillation is an example of the laser oscillator 43.

The first laser head 41 applies a laser beam B1 for adhesive heating to the adhered part 30 of the work W as it heats the adhered part 30. A focus F1 of the laser beam B1 is defocused by, for example, about 4 mm from a heated portion (adhered part 30) of the work W in the direction of the optical axis. If the components are jointed by means of the adhered part 30, the components may be formed of various other materials than metals, such as resins, claddings, ceramics, etc. that cannot be welded with ease.

The second laser head 42 converges on and applies a laser beam B2 for welding to each spot-welded joint 31 of the work W as it welds the welded joint 31. The laser beam B2 is just focused on each spot-welded joints 31 so that a focus F2 is situated substantially on the joint 31. The laser heads 41 and 42 serve as beam control means according to the present invention.

Figure 3:
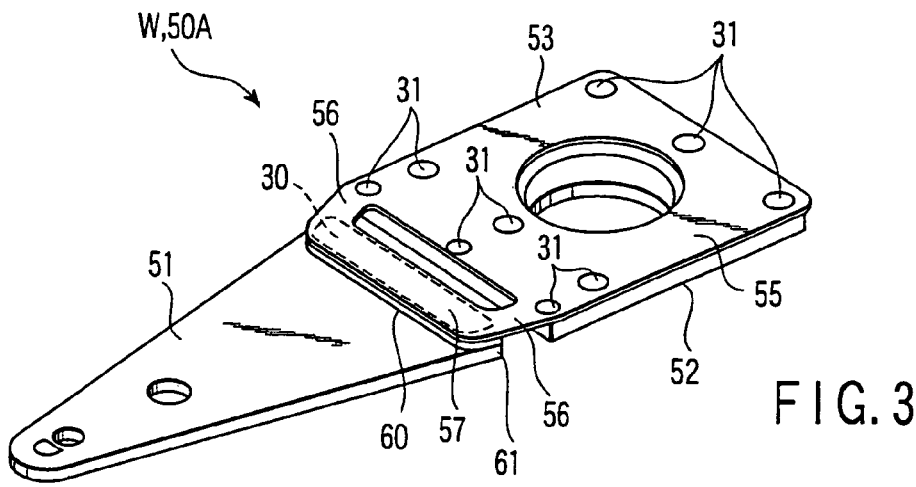
FIG. 3 is a perspective view showing a disc drive suspension as an example of a work.

FIG. 3 shows the disc drive suspension 50A as an example of the work W. For example, suspension 50A comprises a titanium load beam 51 of 100-μm thickness, a stainless-steel baseplate 52 of 200-μm thickness, and a stainless-steel hinge member 53 of 30-μm thickness. The load beam 51 is an example of a platelike component according to the present invention.

A magnetic head having a slider (not shown) is provided on the distal end portion of the load beam 51. For lighter weight, the load beam 51 should preferably be formed of titanium, aluminum alloy, resin, or cladding material that combines light metal and resin. If its weight involves no problem, the load beam 51 may be formed of stainless steel.

The hinge member 53 comprises a proximal portion 55 that overlaps the baseplate 52, a flexible portion 56 that can elastically bend in the thickness direction, and an end portion 57 that overlaps the load beam 51.

The end portion 57 of the hinge member 53 is jointed to an end portion 61 of the load beam 51 by means of the adhered part 30 that uses a thermosetting adhesive agent 60. The proximal portion 55 of the hinge member 53 and the baseplate 52 are jointed to each other by means of the spot-welded joints 31 that are formed by the laser beams.

In this disc drive suspension 50A, a lightweight, high-stiffness material, such as titanium, is used for the load beam 51. Thus, the natural frequency of the disc drive suspension 50A can be enhanced to cope with the development of higher-capacity discs. Since the components are jointed together with the adhesive agent 60, moreover, a damper effect can be expected from the adhesive agent 60 that are sandwiched between the components.

The following is a description of steps of procedure for jointing the load beam 51, baseplate 52, and hinge member 53 of the work W by means of the jointing apparatus 10.

Figure 4:
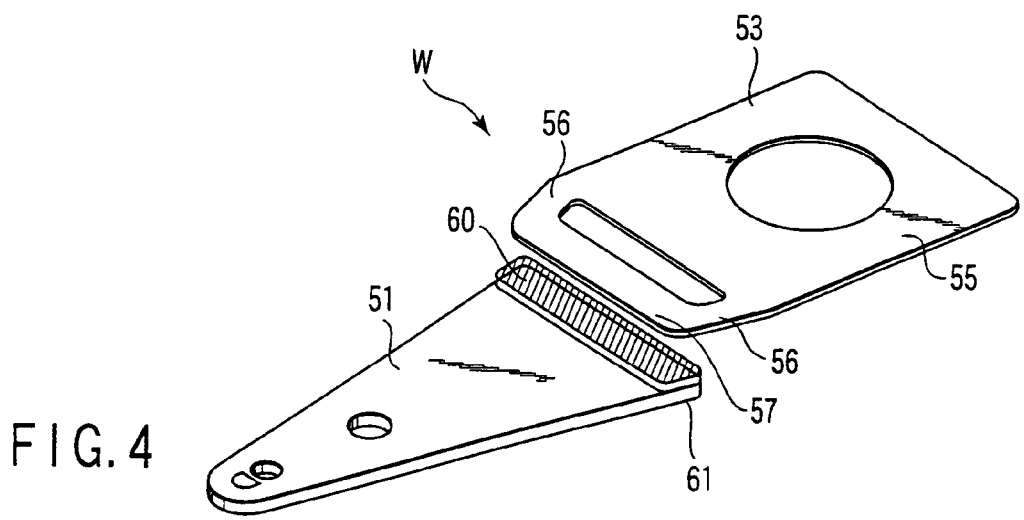
FIG. 4 is a perspective view showing a load beam, hinge member, and thermosetting adhesive agent of the work shown in FIG. 3.

As shown in FIG. 4, the liquid or filmy thermosetting adhesive agent 60 (indicated by hatching) that is not cured yet is supplied to the gap between the end portion 61 of the load beam 51 and the end portion 57 of the hinge member 53.

Figure 5:
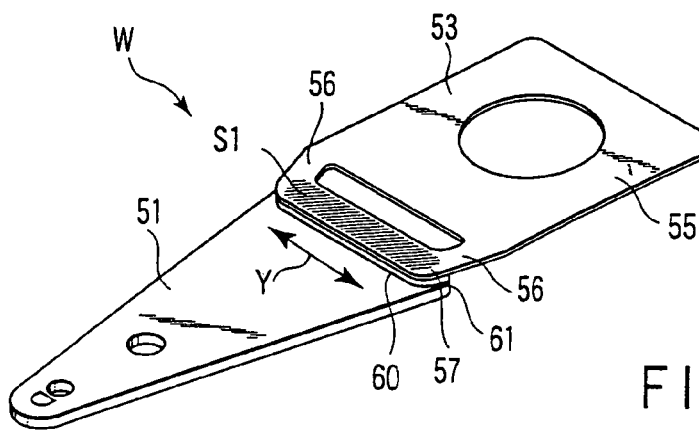
FIG. 5 is a perspective view showing the load beam and the hinge member of the work of FIG. 3 lapped on each other.

Thereafter, the load beam 51 and the hinge member 53 are fixed in predetermined positions by means of the positioning jig 15 shown in FIG. 2 with the end portion 61 of the load beam 51 and the end portion 57 of the hinge member 53 overlapping each other, as shown in FIG. 5. Further, the moving table 20 of the work holding mechanism 12 is driven by means of the driver 21 so that the first laser head 41 is situated right over the through hole 27 of the positioning jig 15.

In this state, the laser beam B1 for adhesive heating from the first laser head 41 is applied to the end portion 57 of the hinge member 53 as the end portion 57 is scanned in the direction of arrow Y in FIG. 5 so that a hatched region S1 is heated locally.

This local heating causes the thermosetting adhesive agent 60 to be primarily set in a short time, so that the end portion 61 of the load beam 51 and the end portion 57 of the hinge member 53 are tacked together. Since the heating by means of the laser beam B1 for adhesive heating is instantaneous, the adhesive agent 60 cannot be fully cured. However, practical strength for necessary tacking to start the next process can be obtained.

If the load beam 51 and the hinge member 53 are tacked together in this manner, the time before the practical strength is obtained is shorter than in the case where a photo-setting adhesive agent is used. Thus, the thermosetting adhesive agent 60 is quickly cured to the practical strength after the work W is positioned. In consequence, the work W can be prevented from being dislocated by thermal expansion of the positioning jig 15 or the like, so that high positioning accuracy can be maintained.

Since the components of the work W are jointed together with the adhesive agent 60, the materials of the components can be selected with a higher degree of freedom than when the components are welded. For the work W, moreover, a joint structure that reconciles desired properties, e.g., high stiffness and light weight, can be obtained in a manner such that different materials are jointed together, for example.

In welding the baseplate 52 and the hinge member 53 together, they are lapped on each other. Then, the moving table 20 is driven by means of the driver 21 so that a region to be welded is situated right under the second laser head 42.

In this state, the laser beam B2 for welding is applied to the region to be welded by means of the second laser head 42. The focal position of the laser beam B2 is adjusted so that it is converged on each spot-welded joint 31. The laser beam B2 sets the baseplate 52 and the hinge member 53 after they are partially melted. Thereupon, the baseplate 52 and the hinge member 53 are jointed together at each spot-welded joint 31.

The spot-welded joints 31 are formed in a plurality of positions, as shown in FIG. 3, as the aforesaid laser spot welding is repeated with the moving table 20 moved in the X- and Y-axis directions.

After the aforementioned tacking process based on the primary curing of the adhesive agent 60 is finished, secondary curing (full curing) of the adhesive agent 60 is carried out. In a heating process for the secondary curing, a plurality of works W are stored as a group in a heating oven, and they are simultaneously heated for a given time. By doing this, a large number of works W can be efficiently heated in a short time.

In this manner, the one jointing apparatus 10 can be used alternatively to carry out curing (or tacking) of the thermosetting adhesive agent 60 by short-time local heating and jointing by laser spot welding as required.

Thus, in jointing the components of the work W that has the adhered part 30 and the spot-welded joints 31 in a mixed fashion, heating the adhered part 30 and the welding the joints 31 can be alternatively carried out by means of the one jointing apparatus 10 by properly using the two laser beams B1 and B2. The jointing apparatus 10 is applicable to a joint structure that has the spot-welded joints 31 only as well as to a joint structure that has the adhered part 30 only.

Figure 6:
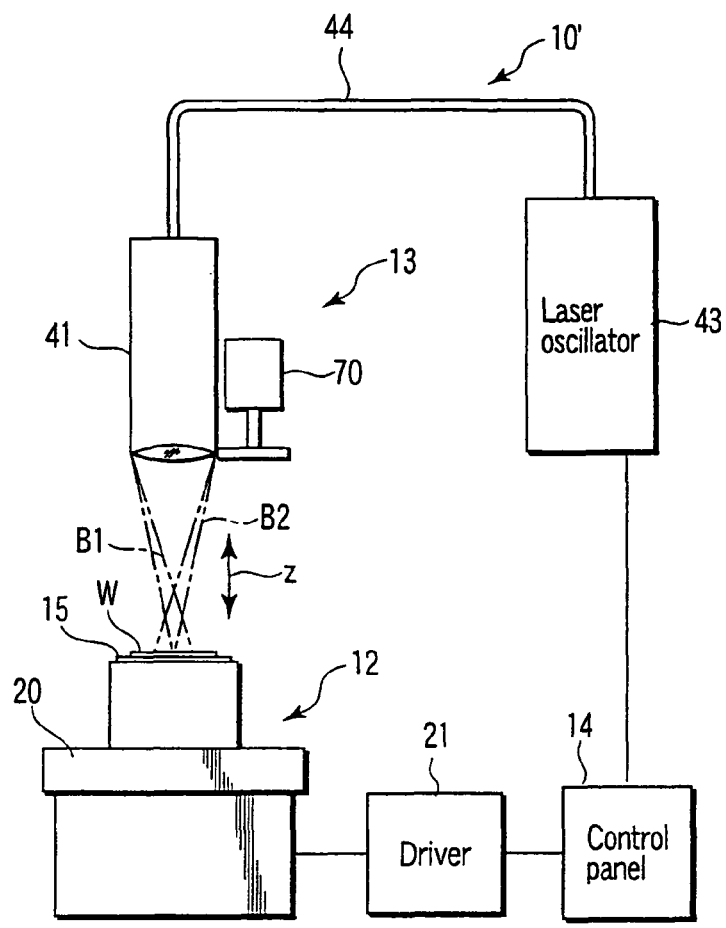
FIG. 6 is a side view of a jointing apparatus according to a second embodiment of the invention.

FIG. 6 shows a jointing apparatus 10' according to a second embodiment of the invention. The jointing apparatus 10' comprises one laser head 41 and a focal position adjusting mechanism 70 that serves as beam control means. With use of the focal position adjusting mechanism 70, a defocused laser beam B1 for adhesive heating and a focused laser beam B2 for spot welding can be applied to the work W.

The focal position adjusting mechanism 70 changes the focal position of the laser head 41 so that the focal position is defocused when the laser beam B1 for adhesive heating is applied to the adhered part of the work W and that the laser beam B2 for welding is just focused when the laser beam B2 is converged on the spot-welded joints of the work W. The jointing apparatus 10' shares other configurations and functions with the jointing apparatus 10 of the first embodiment.

With use of the jointing apparatus 10' constructed in this manner, the laser beam B1 for adhesive heating and the laser beam B2 for welding can be applied to the work W by means of the one laser head 41. Thus, the construction of the jointing apparatus 10' can be simplified.

The focal position adjusting mechanism 70 that serves as the beam control means may be designed to move the laser head 41 in the direction (direction of the optical axis) indicated by arrow Z in FIG. 6. Alternatively, it may be designed to move the moving table 20 in the direction of arrow Z, thereby changing the relative positions of the work W and the focus.

Further, a galvanometer or rotating polygon may be used for scanning with the laser beams. In short, the apparatus should only be provided with beam control means that can defocus a laser beam in a relatively wide range lest its energy be concentrated on a point as it is applied when the adhesive agent is heated, and can just focus the laser beam within a narrow range so that the beam is concentrated on a point during welding.

Figure 7:
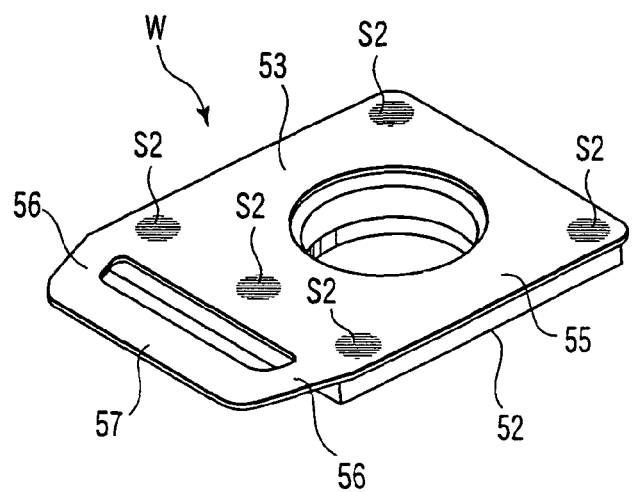
FIG. 7 is a perspective view showing a baseplate and a hinge member as an example of a work.

FIG. 7 shows the way the baseplate 52 and the hinge member 53, as another example of the work W, are jointed together with a thermosetting adhesive agent. In this example, hatched regions S2 are heated with the aforesaid laser beam for adhesive heating for a short time after the thermosetting adhesive agent is supplied between the baseplate 52 and the hinge member 53. Since the adhesive agent is primarily cured by this heating, the baseplate 52 and the hinge member 53 are tacked together.

Figure 8:
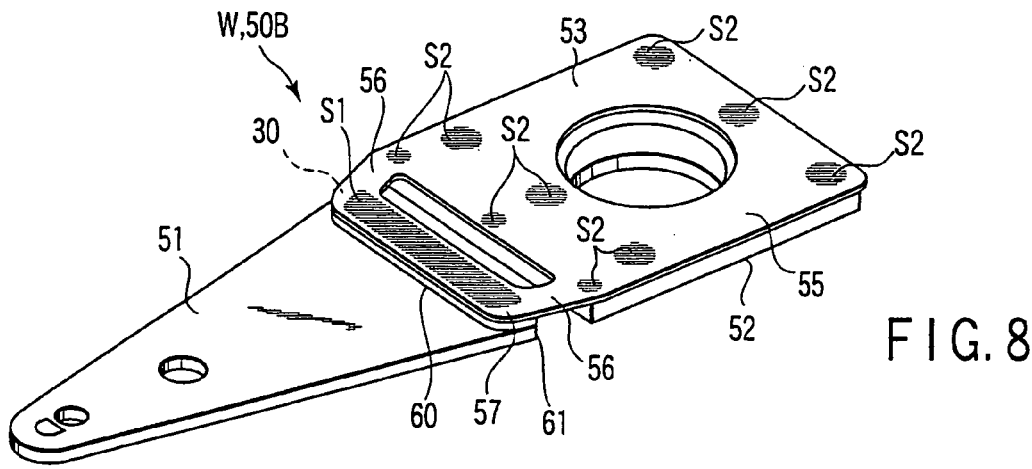
FIG. 8 is a perspective view showing a load beam, hinge member, and baseplate as another example of the work.

In a disc drive suspension 50B shown in FIG. 8, the load beam 51, baseplate 52, hinge member 53 are jointed together with the thermosetting adhesive agent 60. In the case of this suspension 50B, the thermosetting adhesive agent is supplied between the load beam 51 and the hinge member 53 and between the baseplate 52 and the hinge member 53.

Hatched regions S1 and S2 are heated with the laser beam for adhesive heating for a short time. Thereupon, the adhesive agent is locally primarily cured, the load beam 51 and the hinge member 53 are tacked together, and the baseplate 52 and the hinge member 53 are tacked together.

Figure 9:
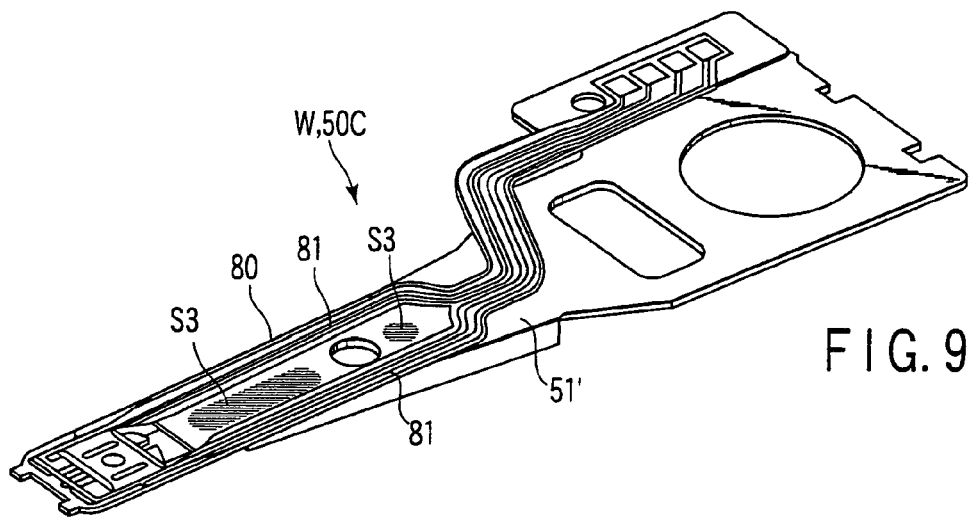
FIG. 9 is a perspective view showing a load beam and a wired flexure as another example of the work.

In a disc drive suspension 50C shown in FIG. 9, a load beam 51' and a flexure 80 are jointed together with the thermosetting adhesive agent. In an example of the flexure 80, a wiring portion 81 is formed on a base of stainless steel having a thickness of 25 μm. The load beam 51' is 70 μm thick, for example.

In the case of the suspension 50C, the thermosetting adhesive agent is supplied between the load beam 51' and the flexure 80. A hatched region S3 is heated with the laser beam for adhesive heating for a short time. Thereupon, the adhesive agent is locally primarily cured, and the load beam 51' and the flexure 80 are tacked together. Alternatively, a flexure that is based on a resin such as polyimide may be adhered to the load beam 51'.

Figure 10:
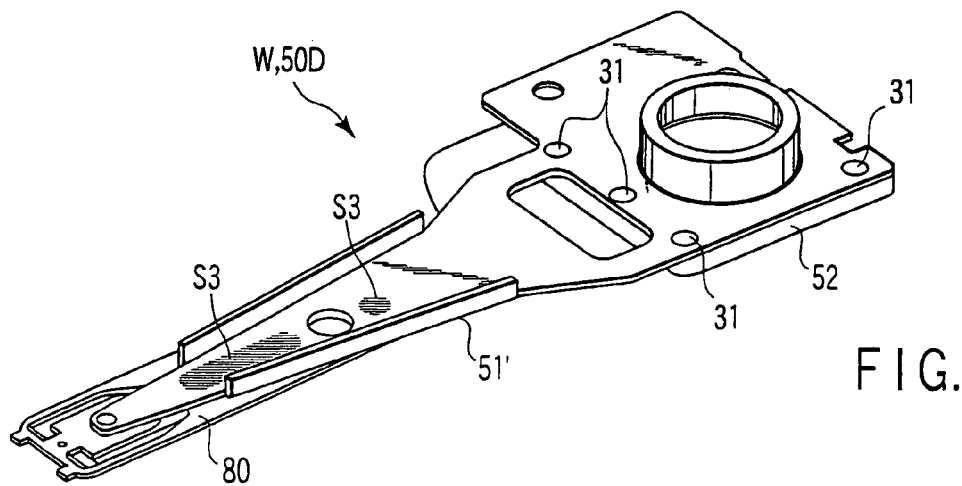
FIG. 10 is a perspective view showing a load beam, wired flexure, and baseplate as another example of the work.

In a disc drive suspension 50D shown in FIG. 10, the load beam 51' and the flexure 80 are jointed together with the thermosetting adhesive agent, while the load beam 51' and the baseplate 52 are jointed together by means of the spot-welded joints 31.

In the case of the suspension 50D, the thermosetting adhesive agent is supplied between the load beam 51' and the flexure 80. Hatched regions S3 are heated with the laser beam for adhesive heating from the back of the load beam 51' for a short time. Thereupon, the load beam 51' and the flexure 80 are tacked together.

Figure 11:
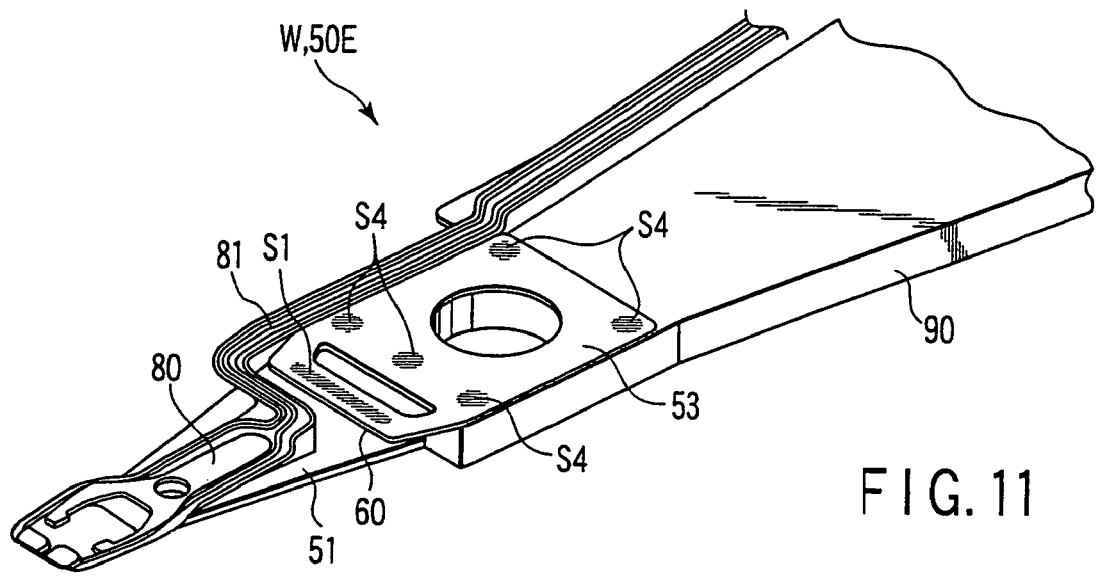
FIG. 11 is a perspective view showing a part of an actuator arm and a disc drive suspension as another example of the work.

In a disc drive suspension 50E shown in FIG. 11, an end portion of an actuator arm 90 and the hinge member 53 are jointed together with the thermosetting adhesive agent, and the hinge member 53 and the load beam 51 are jointed together with the thermosetting adhesive agent 60. In this example, the adhesive agent is locally primarily cured by applying the laser beam for adhesive heating to hatched regions S1 and S4.

Figure 12:
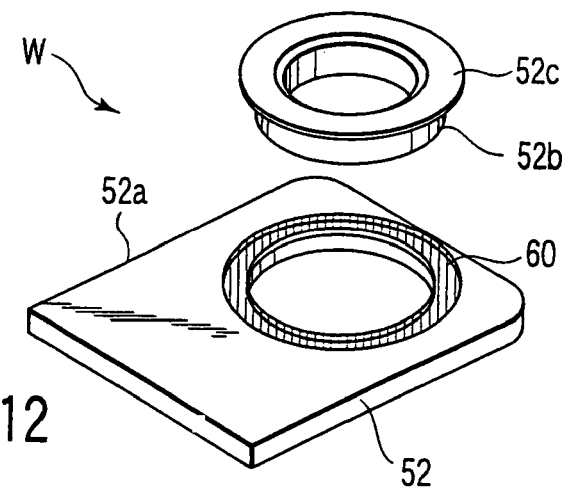
FIG. 12 is a perspective view showing a baseplate having a boss component as another example of the work.
Figure 13:
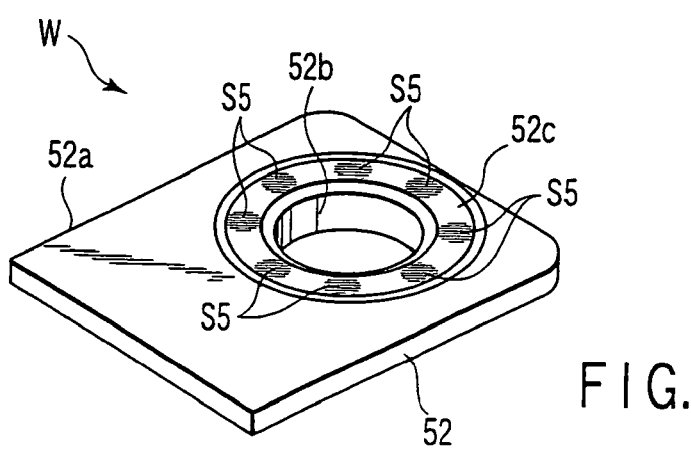
FIG. 13 is a perspective view showing the boss component of FIG. 12 tacked to the body of the baseplate.

In a baseplate 52 shown in FIGS. 12 and 13 is formed of a baseplate body 52a and a boss component 52b. The boss component 52b has a flange portion 52c. In this example, the thermosetting adhesive agent 60 is supplied between the baseplate body 52a and the flange portion 52c. The baseplate body 52a and the flange portion 52c are lapped on each other. Thereafter, the laser beam for adhesive heating is applied to hatched regions S5 for a short time so that the adhesive agent is locally primarily cured. By doing this, the baseplate body 52a and the boss component 52b are tacked together.

It is to be understood, in carrying out the present invention based on these embodiments, that the components of the invention, including the modes of the components that form the joint structure, mode of the adhered part or the spot-welded joints, configurations of the positioning jig and the laser irradiator, etc., may be changed or modified variously without departing from the scope or spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A jointing method for obtaining a disk drive suspension by fixing a plurality of components together at: (i) a first fixing portion configured to fix an overlapping portion of an end portion of a load beam and an end portion of a hinge member which is thinner than the load beam and which has a flexible portion which is elastically bendable in a thickness direction, and (ii) a second fixing portion configured to fix an overlapping portion of a proximal portion of the hinge member and a base plate, the second fixing portion being positioned separately from the first fixing portion, said method comprising:

supplying a thermosetting adhesive agent to the first fixing portion;

holding the elastic hinge member and the load beam in a predetermined position with a positioning jig including a presser member which has a through hole situated to correspond to the first fixing portion, such that the hinge member and the load beam overlap in a state in which the elastic hinge member, together with the adhesive agent, is clamped between a portion around the through hole of the presser member and the load beam;

applying a defocused first laser beam through the through hole to the hinge member in a state in which the hinge member is pressed by the portion around the through hole of the presser member;

performing a primary curing operation of tacking the hinge member and the load beam with the thermosetting adhesive agent by the defocused first laser beam to the first fixing portion during a first time using a first laser head controlled by a controller, so as to heat and cure the thermosetting adhesive agent supplied to the first fixing portion;

laser welding the second fixing portion by applying a converged second laser beam to the second fixing portion using a second laser head, which is controlled by the controller, so as to weld the proximal portion of the hinge member and the base plate; and fully curing the suspension having the first fixing portion which is tacked and the second fixing portion which is laser welded, by storing said suspension in a heating oven after the primary curing operation and the laser welding are performed for the suspension, and heating the thermosetting adhesive agent with the heating oven during a second time so as to perform secondary curing of the thermosetting adhesive agent.

2. A jointing method according to claim 1, wherein in the primary curing operation the defocused first laser beam is applied to a region narrower than a region supplied with the thermosetting adhesive agent.

* * * * *